Aug. 30, 1966        T. D. NAST ETAL        3,269,248
           APPARATUS FOR PROCESSING WELDING WIRE
Original Filed Sept. 27, 1963                2 Sheets-Sheet 1

Thomas D. Nast
and
Richard G. Wooldridge
INVENTORS

BY Jacobi & Davidson

ATTORNEYS

Aug. 30, 1966 T. D. NAST ETAL 3,269,248
APPARATUS FOR PROCESSING WELDING WIRE
Original Filed Sept. 27, 1963
2 Sheets-Sheet 2
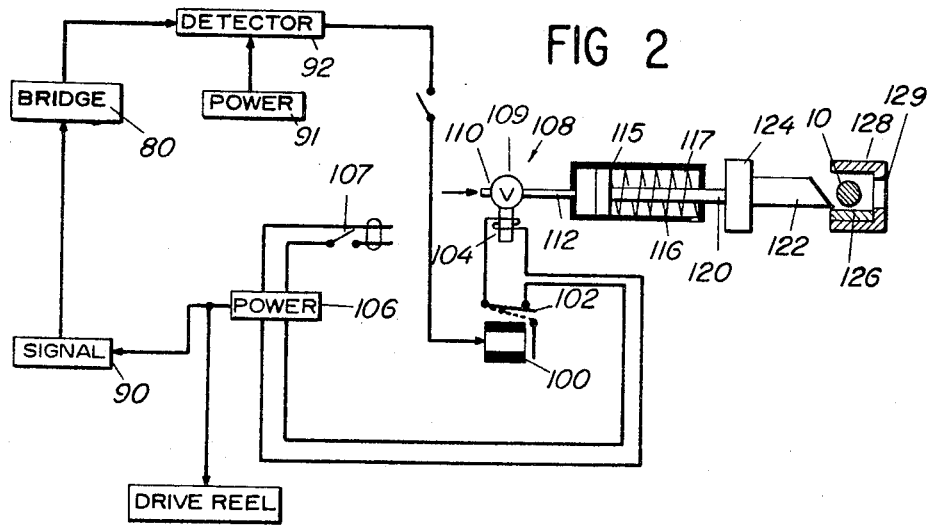
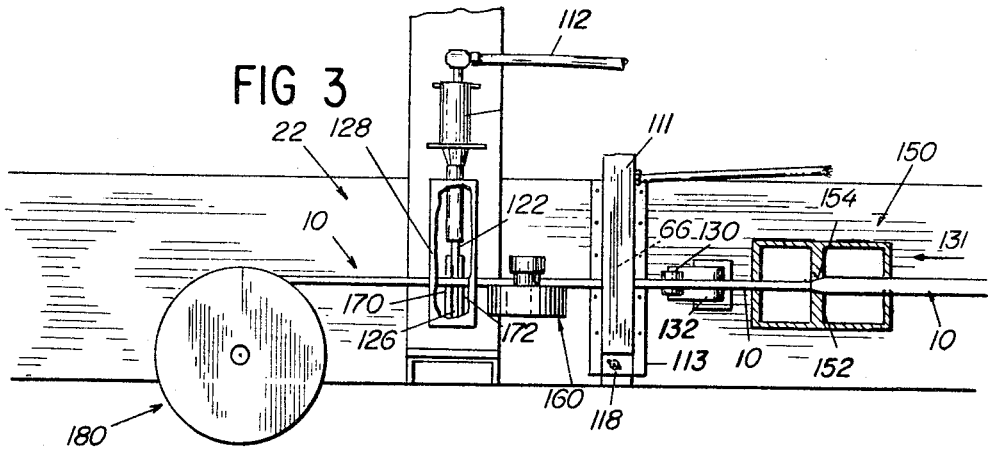
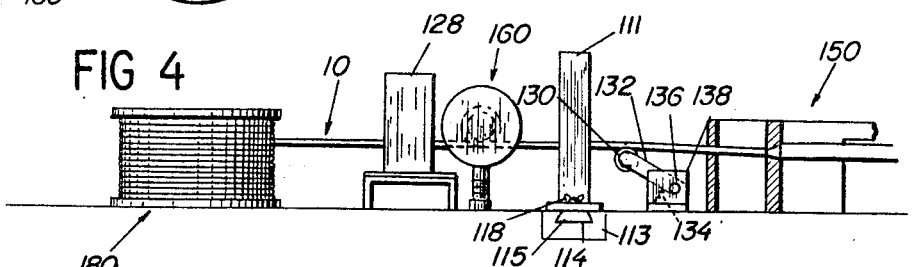
Thomas D. Nast and Richard G. Wooldridge
INVENTORS
BY Jacobi & Davidson
ATTORNEYS United States Patent Office 3,269,248
Patented August 30, 1966

1

3,269,248
APPARATUS FOR PROCESSING WELDING WIRE
Thomas D. Nast, White Plains, N.Y., and Richard G. Wooldridge, Glastonbury, Conn., assignors to All-State Welding Alloys Co., Inc., White Plains, N.Y., a corporation of New York
Original application Sept. 27, 1963, Ser. No. 312,221, now Patent No. 3,210,838, dated Oct. 12, 1965. Divided and this application Jan. 21, 1965, Ser. No. 435,770
4 Claims. (Cl. 83—371)

This application is a divisional application of co-pending application Serial No. 312,221, filed September 27, 1963, now Patent No. 3,210,838 and entitled "Method and Apparatus for Processing Welding Wire."

This invention relates to the processing of wire products, and is particularly concerned with apparatus for sensing and removing defects from wire—e.g., wire which is to be used in welding operations.

In making certain types of welding wire, as for example aluminum welding wire, it is conventional to extrude the aluminum in wire form, and to thereafter draw the aluminum so that the same obtains proper strength properties. Extrusion is but one method by which aluminum wire can be made, but still an extruded wire can serve as a basis for explaining defects which are commonly encountered.

In any metal extruding operation, the base material commonly is initially handled in ingot form. The ingots contain not only the major constituents, but also alloy constituents which render the ultimate extruded unit suitable for use in the particular application. In the case of aluminum, where ingots are used, it is common to find impurities even within closely controlled tolerances which can be met under commercial limitations. Thus, iron particles, silicone particles, earth particles (dirt), grease, carbon particles, and the like are often contained in the ingot. Moreover, once the ingot has been heated, and the wire is extruded therefrom, it is common to experience some segregation of alloying elements, some discontinuity of internal structure, some so-called "cold lapping" and some surface scratches.

The impurities and defects in the ingot appear to be comparatively minor because of the ingot size, but the wire which is extruded from the ingot has a small diameter or cross section, and accordingly, any impurity can be of major importance in the extruded wire, although only of minor significance in the original ingot. Moreover, the extruded wire, as indicated, is normally drawn and/or worked to impart the desired strength properties thereto, and thus a surface scratch in the originally formed extruded wire may be comparatively small, whereas after the drawing operation and the resulting further reduction of diameter or cross section, such scratch may be spread over a substantial area on the drawn product having a reduced diameter. The same considerations apply to segregation of the alloying elements, cold lapping and discontinuities in internal structures. In essence, a defect in the ingot often manifests itself as a major defect in the extruded aluminum wire, and the defect in the wire as initially extruded, often manifests itself as a substantially larger defect in the drawn wire forming the final product.

It is important that defects of the above described type be eliminated because as long as such defects remain, the ultimate weld will not be of uniform strength, nor free of porosity. (In wire otherwise formed, other defects of equal importance may be encountered.)

Bearing the foregoing factors in mind, it is a primary specific object of the present invention to provide an apparatus for sensing defects in wire so as to eliminate defective sections from the wire, and permit the processing only of wire lengths which are substantially perfect. In this regard, it is a further specific object hereof to sense not only the internal defects, but also the external defects, and to do so in advance of major wire forming operations so that the wire which is subjected to such forming operations is essentially free of defects from the start.

Aside from the foregoing more basic general object of the invention, there are certain additional objects hereof, namely, (a) the provision of an apparatus for sensing defects in a welding wire, which apparatus operates by sensing inductance and/or magnetic field variations which results from defects in wire passing through such inductance and such field; (b) to provide such an apparatus wherein an electrical sensing signal developed as a result of the sensing operation controls operation of an automatic cutting knife which severs the wire instantaneously upon sensing of a defect therein; (c) the provision of such an apparatus wherein the sensing mechanism is disposed in advance of the cutting mechanism so that the cutting mechanism is operative to sever the wire before the defect sensed by the sensing mechanism reaches the cutting mechanism; (d) the provision of such an apparatus which readily permits the separation from a length of wire of a given portion thereof, and the welding of the cut ends of the remaining wire together so that the wire can be maintained as a single length for further operations; (e) the provision of such an apparatus wherein the cutting mechanism is operative under fluid pressure, and preferably air pressure, easily controllable through a solenoid operated valve, or may be operated by an electrical solenoid having sufficient force, to achieve instantaneous severing of the wire in response to a detected defect; and (f) the provision of such a sensing and cutting mechanism which can be easily constructed at a minimum cost to operate for extended periods of time without requiring repair.

The invention has been found to have particular utility when used in the formation of aluminum welding wire, but it is to be understood that the same is applicable to titanium welding wire, magnesium welding wire, and other welding wires where the absence of internal defects are of primary importance to uniformity and strength in the ultimate weld which is made with the wire being processed.

In accordance with the invention, initially formed and/or initially drawn wire is subjected to an internal defect sensing operation, and portions of the wire having defects therein are severed from the remaining wire. The remaining wire parts are joined together, as by welding, so that they remain as a continuous length. Such continuous length is then preferably processed through further drawing operations, preferably in opposite directions, and/or through other strength giving operations. Thereafter, the wire can be scrubbed, washed and wiped so as to clean the surface thereof.

These are but very basic features of the invention, and the invention itself, will be better understood by reference to the following detailed description.

Such description makes reference to the accompanying drawings which present preferred and illustrative embodiments of the invention.

In the drawings:

FIGURE 1 is a schematic view showing a series of processing stations utilized for handling welding wire in accordance with the invention;

FIGURE 2 is a schematic view of the circuit arrangement and cooperating means used at the sensing and cutting station of FIGURE 1;

FIGURE 3 is a plan view of the structural assembly utilized in sensing a defect in the wire being handled and in severing the wire once the defect is sensed;

FIGURE 4 is a side view of the arrangement shown in FIGURE 3; and

FIGURE 5 is a fragmental detailed view of the sensing and cutting elements utilized in the arrangement of FIGURES 3 and 4.

In FIGURE 1, a roll of raw or rough wire stock 10 is shown as being disposed at the first of the processing stations. This stock 10, for example, can be extruded aluminum wire and for purposes of this description, the same is considered as such. However, as indicated above, the invention is applicable to wire otherwise formed, and to other wires than aluminum wire. Still, for convenience, it will be assumed that the wire 10 is rough extruded aluminum wire such as the end product of a conventional aluminum wire extruding machine.

The wire 10, as formed, has little strength and the same must be worked in order to impart the desired strength properties thereto. For this purpose, as also indicated above, it is conventional to pass the wire through a series of drawing stations wherein the wire is drawn, preferably, first in one direction and then in an opposite direction so as to achieve uniform strength and desired grain orientation.

In the arrangement of FIGURE 1, the rough wire is initially passed to a first drawing station 12 where a conventional drawing head 13 is disposed. Naturally, a drawing lubricant would be placed on the wire adjacent the drawing head 13 so that the drawing can be carried out effectively. In FIGURE 1, the lubricant depositing means, and the support for the drawing head, have been eliminated for purposes of simplicity, and because the operation will readily be understood by those familiar with the art.

After the wire which is being processed has passed the first drawing station 12 where some strength is imparted thereto, and where the diameter is somewhat reduced, then defects in the wire 10 are sensed in accordance with the invention.

Thus, as shown in FIGURE 1, a sensing station 14 is provided with a sensing means 16, which sensing means determines the existence of any defect in the wire. The output of the sensing means, as shown, is fed to a detector or detecting means 18 which is operatively linked with a cutter 20 disposed in the path of the wire 10 and located at the cutting station 22.

As explained more fully below, the sensor 16 serves to detect imperfections in the wire and in response thereto, the cutter 20 is operated to sever the wire so that a portion of its length may be removed from the entire length of the wire, with the remaining parts welded together to establish a continuous length ready for further processing. Because of the need for uniformity in cross-sectional area of the wire and due to the necessity of defect-free wire, the welding operation is a conventioal fusing process thereby doing away with an added material or weld to the wire.

Once the defects have been removed, the wire which leaves the cutter 22 is further processed, and if aluminum wire is being used, the same, for example, is subjected to further drawing operations as indicated at the station 24. These further drawing operations may be carried out on a multiple pass drawing machine, or through the use of separate drawing heads. In any event, as indicated, the drawing is preferably performed first in one direction and then in an opposite direction, so that the ultimate wire has uniform strength and grain orientation.

Although further drawing operations have been shown, it is to be understood that in certain instances, the wire may be further processed without being subjected to additional drawing operations, or without being "worked." Still, the wire which passes from the cutting station 22 is free of the defects there sensed and removed. Such wire, as either further processed or as it leaves the cutting station 22, can be wound on spools for cleansing treatment. Alternatively, the process can be carried out continuously, as indicated in FIGURE 1.

As best shown in FIGURE 5, the wire 10 which leaves the drawing head 13 has a reduced diameter, and is passed through the sensor 16 at the station 14, which sensor, comprises a coil of electrically conductive wire 66.

Coil 66 has an axial opening 62 therein, or more particularly the spool 64 on which the wire strand is wound has a central opening 62 therein. Thus, the wire 10 which passes through the spool 64 effectively serves as a core for the coil 66. Any defect, such as the defect 60 in the wire 10 shown in FIGURE 5, renders the core of the coil nonuniform, and, accordingly, affects the magnetic field and inductance of the coil 66. More particularly, the inductance of the coil 66 varies with the existence of a defect, such as the defect 60 in the wire 10.

This variation in the inductance of the coil 66, or in the magnetic field created thereby, is utilized in accordance with the invention to effect the cutting operation. More specifically, as shown in FIGURE 5, the coil 66 is but one leg of an inductance-resistance bridge generally designated by the numeral 80. Such bridge includes as one leg the coil 66, the coil 82 as another leg, and as further legs, the respective resistors 84 and 86. The signal source 90 is coupled between a pair of branches of the bridge including, respectively, resistors 84 and 86 and inductances 82 and 66. The detector 92 is coupled across the bridge, so that the arrangement generally corresponds to that of a Wheatstone bridge. The bridge is initially balanced by adjustment of the variable inductance 82 with non-defective wire disposed in the coil 16. Thereafter, if a defect is experienced in the wire 10, the balance of the bridge is no longer maintained and the detector 92 senses the imbalance of the bridge.

By referring to FIGURE 2, it will be seen that the basic arrangement essentially comprises the signal source 90, the bridge 80 and the detector 92. In essence, the signal source feeds a signal to the bridge, and the bridge in turn develops an output signal which is fed to the detector when a defect is encountered in the wire by the coil 66.

The common power source 106, energized by the switch 107, supplies power to the signal 90, bridge 80, and the drive reel 70, respectively. In the schematic showing of FIGURE 2, the detector 92 is provided with its individual power source 91, but could be easily supplied from the common power source 106 where desirable.

The mere sensing of a defect is not in itself sufficient because in handling the wire, one is not only concerned with whether or not a defect is in existence, but is further concerned with eliminating the defect so that the wire can be further processed. Thus, in accordance with the invention, the detector 92 is utilized to operate a cutting mechanism 22. More particularly, the detector 92 operates a relay 100 having a switching arm 102 which is moved in response to an output from the detector 92. When the switching arm 102 is moved to the position shown in FIGURE 2, the same establishes a circuit through a valve control 108 which is supplied with current from a power source 106. The coil 104 is the operating coil of a solenoid operated valve 109 and when current is passed through the coil 104, the valve 109 opens. In accordance herewith, air is fed under pressure into the line 110 and when the valve opens, such air passes through the line section 112 and into a cylinder 115. Disposed within the cylinder 115 is a piston 116 urged to the position shown by a spring 117. Leading from the piston 116 is a piston rod 120 which has a cutter blade 122 fixed on the end thereof by a suitable coupling 124.

When the relay switch arm 102 moves upwardly from the dotted line position shown, it closes the circuit through the coil 104, thereby opening the valve 109 and permitting the air under pressure to pass into the cylinder 114. As a result, the piston 116 moves to the right, as shown, thereby compressing the spring 117 and moving the knife 122 to the right as shown. The knife is guided within a channel 126 in a cutting housing 128 and passes through such housing and into the lateral opening 129 therein. The wire 10 passing through such housing is accordingly severed.

From the above, it will be understood that when a defect in the wire 10 is sensed by the coil 66, the bridge 80 is unbalanced and, accordingly, the detector 92 produces an output. This output activates the solenoid operated valve control 108 in the air supply lines 110, 112 to the cylinder 115, to open the valve 109. With opening of the valve, the piston 116 is moved to the right, thereby moving the knife across the path of the wire 10 and severing the wire. Thus, in response to sensing a defect in the wire, the cutter mechanism is operated to sever the wire.

Once the wire is severed, the operator immediately knows that a defect has been encountered. Accordingly, he cuts a short length of the wire from the continuous length, and he then welds together the adjacent ends of the remaining wire portions in the manner set forth above. The operation is then started until another defect is detected.

Preferably, the welding operation is carried out such that the welded joint must pass through the sensing mechanism. The welded joint in the wire at this point, is generally uniform with the remainder of the wire. Thus, sensing the welded joint would not affect the sensor so as to actuate the cutting mechanism. On the other hand, if the joint which is made in welding the parts together is not sufficient, or generally uniform, then the sensing mechanism and cutter mechanism again operate, whereby the wire is severed, and a new welded joint must be made.

In other words, by this procedure, not only are internal defects in the wire sensed, but once the wire is cut and a short portion severed therefrom, whereupon the parts are again joined together, the juncture of the joined parts is examined by the sensor.

Bearing in mind the operations described above, attention can now be directed to FIGURES 3 and 4 which present the basic over-all structural arrangement incorporated preferably at the stations 14 and 22. In FIGURES 3 and 4, the sensing coil 66 is shown as being disposed in a support frame 111. This frame is itself supported by a slide track 113, which as shown in FIGURE 4, has a dovetail slideway 114 therein. The bottom of the support frame 111 carries a cooperating dovetail projection 119 which rides in the slideway 114. The frame 111 is thus laterally slideable with respect to the axis of travel of the wire 10, so as to permit the proper adjustment of the support 111 and in turn, the proper disposition of the coil 66. To this end, the support 111 carries a set screw or bolt 118 on one end portion thereof, which set screw or bolt, when tightened downwardly, abuts the slideway 114 to maintain the frame 111 in pre-set position.

To the right of the support 111 or in advance thereof with respect to the direction of travel of the wire 10 as shown by the arrows 131, a guide roller 130 is provided. This roller is supported in position by a pivotally mounted arm 132 which rotates about a pivot shaft 136. The pivot shaft 136 is supported in a bracket 138 and the spring 134 cooperates between the base of the bracket and the pivotally supported arm 132 to urge the roller 130 upwardly.

To the right or in advance of the support roller 130, a drum box 150 is incorporated. This box includes a drawing head support member 152 which has a drawing head 154 supported therein. The wire 10 passes through the drawing head 154 whereupon the diameter of the wire is reduced and thereafter passes over the roller 130 and then through the center of the coil 66. The wire which is leaving the coil 66 passes under a guide roller arrangement 160 and then through the cutting housing 128. The guide channel 126 is provided in the cutter housing 128 by a pair of bar members 170 and 172 cooperating with the base of the housing to define a reciprocating path receiving the lower edge of the cutter element 122.

The wire 10 which has passed the cutter station 22 can, if desired, and as shown in FIGURES 3 and 4, be wound upon a take-up spool 180 which rotates about a vertical axis. The wire can then be transferred to another location for subsequent working through drawing or like operation. Alternatively, the wire can be transported to another location for performing the washing and surface cleaning operations thereon. Still as another alternative, the wire can be continuously fed to the cleaning operation, as indicated in FIGURE 1.

Although a bridge-type sensing means has been shown in the drawings and described above, it should be appreciated that other types of sensing means can be utilized in accordance herewith. The bridge-type sensing means is preferred, however, because the same can be easily operated by a single source having a frequency in the audio range and preferably a frequency of between 3 kc. and 5 kc.

The particular form of relay, detecting means, signal source, and other electrical components which are utilized in the arrangements shown can be varied. However, generally conventional components are available for use in the combined assembly and arrangement and, therefore, it does not appear necessary to further consider the details of each component discussed.

After reading the foregoing description of the preferred and illustrative embodiments of the invention, it should be apparent that the objects set forth at the outset of the present specification have been successfully achieved. Accordingly,

What is claimed is:

1. Apparatus for sensing and removing defects from wire comprising in combination:
    (a) a normally balanced bridge circuit having in one arm thereof an inductance means through which a wire is adapted to pass to cause variations in the impedance thereof in response to defects in the wire, said inductance means comprising a coil of electrically conductive wire, said bridge circuit producing an electrical output in response to variations in said impedance;
    (b) frame means;
    (c) a coil support mounted on said frame means for reciprocal movement along a first axis, said coil support carrying said coil thereon whereby said coil can be adjusted on said axis to receive the wire therethrough;
    (d) first and second roller means disposed on said frame on opposite sides of said coil support, said first and second roller means engaging respectively opposite portions of the wire, at least one of said roller means including a movably mounted roller and spring means for urging said roller to a position in engagement with the wire;
    (e) cutter means comprising a knife, means mounting said knife for reciprocal movement across the path of movement of the wire and along an axis parallel to said first axis, and means for normally urging said knife to a retracted position outside said path of movement; and,
    (f) means for operating said cutter means in response to said electrical output comprising a fluid operated piston and cylinder means for reciprocating said knife, a fluid supply, and an electrically activatable valve means responsive to said electrical output, said electrically activated valve being disposed between said fluid supply and said piston and cylinder means whereby said fluid supply causes said piston and cylinder means to move said reciprocating knife across said path of said wire when said valve means is activated.

2. The apparatus defined in claim 1 wherein said frame means and said coil support have a dovetail slideway and cooperating dovetail guide mounting therebetween.

3. Apparatus for sensing and removing defects from wire comprising in combination:

(a) a normally balanced bridge circuit having first and second pairs of terminals and having in one arm thereof an inductance means through which a wire is adapted to pass to cause variations in the impedence thereof in response to defects in the wire, said inductance means comprising a coil of electrically conductive wire;

(b) an audio frequency electrical power source connected across said first pair of terminals of said bridge;

(c) sensing means connected across said second pair of terminals of said bridge for sensing imbalance of said bridge circuit and producing an electrical output corresponding to said imbalance and in turn to variations in said impedance resulting from defects in the wire;

(d) cutter means comprising a knife, means mounting said knife for reciprocal movement across the path of movement of the wire and along an axis parallel to said first axis, and means for normally urging said knife to a retracted position outside said path of movement; and, (e) means for operating said cutter means in response to said electrical output comprising a fluid operated piston and cylinder means for reciprocating said knife, a fluid supply, and an electrically activatable valve means powered by said audio frequency electrical power source and responsive to said electrical output, said electrically activated valve being disposed between said fluid supply and said piston and cylinder means whereby said fluid supply causes said piston and cylinder means to move said reciprocating knife across said path of said wire when said valve means is activated.

4. Apparatus for sensing and removing defects from wire comprising in combination:

(a) a normally balanced bridge circuit having first and second pairs of terminals and having in one arm thereof an inductance means through which a wire is adapted to pass to cause variations in the impedence thereof in response to defects in the wire, said inductance means comprising a coil of electrically conductive wire;

(b) an audio frequency electrical power source connected across said first pair of terminals of said bridge;

(c) sensing means connected across said second pair of terminals of said bridge for sensing imbalance of said bridge circuit and producing an electrical output corresponding to said imbalance and in turn to variations in said impedance resulting from defects in the wire;

(d) frame means;

(e) a coil support mounted on said frame means for reciprocal movement along a first axis, said coil support carrying said coil thereon;

(f) first and second guide means disposed on said frame on opposite sides of said coil support, said first and second guide means engaging respectively opposite portions of the wire;

(g) cutter means comprising a knife, means mounting said knife for reciprocal movement across the path of movement of the wire and along an axis parallel to said first axis, and means for normally urging said knife to a retracted position outside said path of movement; and, (h) means for operating said cutter means in response to said electrical output comprising a fluid operated piston and cylinder means for reciprocating said knife, a fluid supply, and an electrically activatable valve means powered by said audio frequency electrical power source and responsive to said electrical output, said electrically activated valve being disposed between said fluid supply and said piston and cylinder means whereby said fluid supply causes said piston and cylinder means to move said reciprocating knife across said path of said wire when said valve means is activated.

References Cited by the Examiner

UNITED STATES PATENTS

| Re. 21,003 | 2/1939 | Knerr et al. | 324—40 |
| 2,124,577 | 7/1938 | Knerr | 324—40 |
| 2,309,343 | 1/1943 | Farrow | 83—371 X |
| 2,326,344 | 8/1943 | Elmendorf et al. | 324—40 X |
| 2,441,837 | 5/1948 | Ness et al. | 83—370 X |
| 2,890,750 | 6/1959 | Depken | 83—370 X |
| 3,089,375 | 5/1963 | Williamson | 83—588 X |

WILLIAM W. DYER, Jr., *Primary Examiner.*

F. T. YOST, *Assistant Examiner.*